United States Patent [19]

Hashimoto et al.

[11] 4,131,347
[45] Dec. 26, 1978

[54] LIGHT BEAM PROJECTING APPARATUS

[75] Inventors: Mitsuo Hashimoto, Kodaira; Mitsuo Koguchi, Omuta, both of Japan

[73] Assignees: Bridgestone Tire Company Limited; Mitsui Miike Seisakusho Engineering Company Limited, both of Tokyo, Japan

[21] Appl. No.: 786,626

[22] Filed: Apr. 11, 1977

[30] Foreign Application Priority Data

Apr. 17, 1976 [JP] Japan .................................. 51-43884

[51] Int. Cl.² ...................... B29H 17/00; G03B 21/26
[52] U.S. Cl. ....................................... 353/28; 353/120; 353/109; 156/123 R
[58] Field of Search .................... 353/28, 40, 108, 109, 353/120, DIG. 2; 33/286, 227; 156/123; 356/164

[56] References Cited

U.S. PATENT DOCUMENTS

| 1,566,519 | 12/1925 | Blankenship | 353/108 |
| 3,216,318 | 11/1965 | Gaffard | 353/40 |
| 3,221,594 | 12/1965 | Vargady | 353/40 |
| 3,242,605 | 3/1966 | Kleinschmidt | 353/120 |
| 3,526,454 | 9/1970 | Gerry | 353/120 |
| 3,728,027 | 4/1973 | Watanabe | 353/28 |

Primary Examiner—Richard E. Aegerter
Assistant Examiner—John W. Shepperd
Attorney, Agent, or Firm—Cushman, Darby & Cushman

[57] ABSTRACT

In order to decrease light beam projectors and avoid time consuming and tedious transferring and exchanging operations in the tire manufacturing process, a light beam projecting apparatus of the present invention for use in production of an endless rubberized cord fabric, comprises a light beam projector disposed in spaced and opposed relation with a tire building drum to wrap a band-formed rubberized cord fabric; an indicator assembly located in the vicinity of the light beam projector and interposed between the light projector and the tire building drum, the indicator assembly including an indicator film having a multiplicity of indicating lines spaced from each other in a direction parallel to the rotational axis of the tire building drum to be projected upon the peripheral surface of the tire building drum; and a focus lens assembly arranged between the tire building drum and the indicator assembly and including at least a focus lens in alignment with the light beam projected through the indicator film by the light beam projector so as to focalize and enlarge indicated lines projected on the peripheral surface of the tire building drum.

5 Claims, 8 Drawing Figures

LIGHT BEAM PROJECTING APPARATUS

This invention relates to a light beam projecting apparatus for use in production of an endless rubberized cord fabric and more particularly to a light beam projecting apparatus which is used in the event that an unvulcanized band-formed rubberized cord fabric to be fabricated into a vehicle tire is wrapped in several plies on and around the peripheral surface of a tire building drum.

Conventionally, there has been used as such a light beam projecting apparatus an apparatus in which a multiplicity of light beam projectors are slidably and spacedly supported on a supporting rod spaced from and extend along a tire building drum so as to project light beams on the outer peripheral surface of the tire building drum in spaced relation along its rotational axis. For this type of light beam projecting apparatus, it was required to transfer the light beam projectors along the supporting rod at every time to produce a variety of endless cord fabrics with different widths. The transferring operation of the light beam projectors was time consuming and tedious since many light beam projectors were provided. Additionally, the filaments of the projectors frequently became off which made it necessary to instantly exchange new ones. These resulted in low operational efficiency for an attendant operator.

It is therefore an object of the present invention to provide a light beam projecting apparatus which overcomes the previously mentioned drawbacks by decreasing the number of separate light beam projectors to avoid time consuming and tedious transferring and exchanging operations which were thus far necessitated.

In accordance with the present invention, there will be provided to accomplish such an object an apparatus which is used for production of an endless rubberized cord fabric and comprises a light beam projector disposed in spaced and opposed relation with a tire building drum to wrap a band-formed rubberized cord fabric; an indicator assembly located in the vicinity of the light beam projector and interposed between the light beam projector and the tire building drum, the indicator assembly including an indicator film having a multiplicity of indicating lines spaced from each other in a direction parallel to the rotational axis of the tire building drum to be projected upon the peripheral surface of the tire building drum; and a focus lens assembly arranged between the tire building drum and the indicator assembly and including at least a focus lens in alignment with the light beam projected through the indicator film by the light beam projector so as to focalize and enlarge indicated lines projected on the peripheral surface of the tire building drum.

The features and advantages of the apparatus according to the present invention will become more apparent from the following description taken in conjunction with the accompanying drawings, in which.

Figure 1:
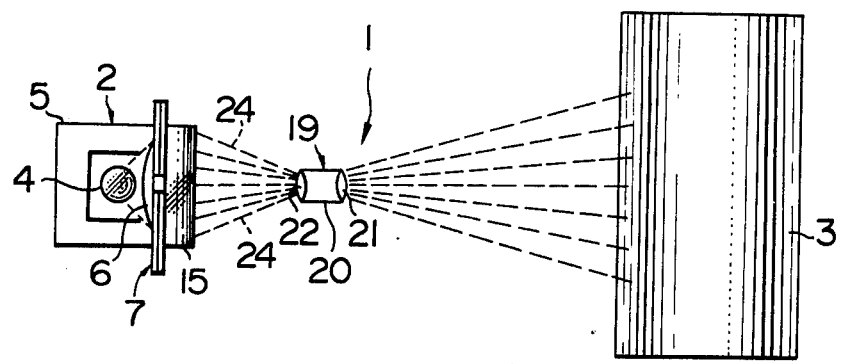
FIG. 1 is a schematic plan view of a light beam projecting apparatus embodying the present invention.
Figure 2:
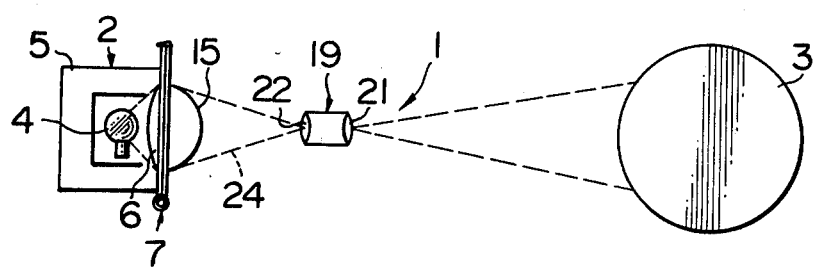
FIG. 2 is a schematic side view of the light beam projecting apparatus as shown in FIG. 1.
Figure 3:
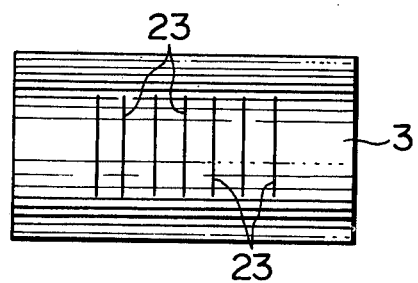
FIG. 3 is a front view of a tire building drum and shows indicated lines projected thereon.
Figure 4:
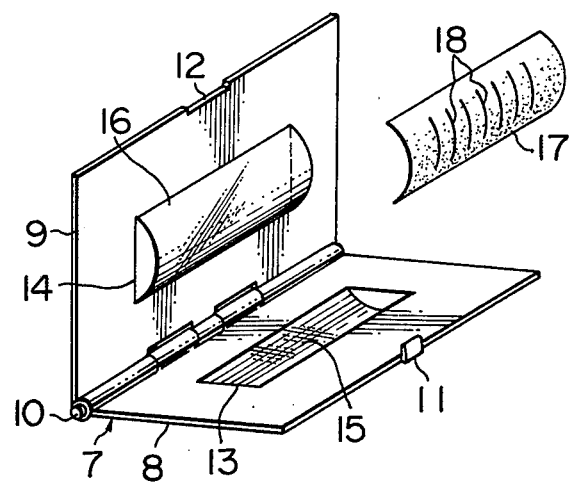
FIG. 4 is a perspective view of an indicator assembly and shows opened plates and an indicator film taken out of the plates.
Figure 5:
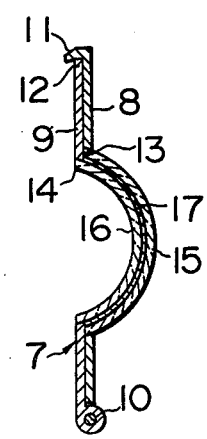
FIG. 5 is a cross-sectional view vertically cross-sectioned through the central portion of the indicator assembly and shows the plates closed to retain the indicator film.

Referring now to the drawings and particularly to FIGS. 1 and 2, there is shown a light beam projecting apparatus, generally designated at 1, of the present invention which comprises a light beam projector generally denoted at 2 and disposed in spaced and opposed relation with a tire building drum 3 to wrap a band-formed rubberized cord fabric on itself for production of an endless rubberized cord fabric. The light beam projector 2 includes a light source 4, a shroud 5 accommodating therein the light source 4 and having an aperture at the forward portion thereof, and a convex lens 6 for converging a light beam from the light source 4 toward the tire building drum 3. Located in the vicinity of the light beam projector 2 and interposed between said light beam projector 2 and the tire building drum 3 to cover the aperture of the projector 2 is an indicator assembly, generally indicated at 7, which is best shown in FIGS. 4 and 5 as comprising a pair of plates 8 and 9 hinged at their one ends through a pin 10. The plates 8 and 9 are adapted to be provided with a hook 11 and groove 12, respectively, which are engageable with each other. At the central portions of the plates 8 and 9 are respectively formed rectangular openings 13 and 14 which extend laterally in parallel with the pin 10 and which are designed to mate with curved members 15 and 16, respectively, formed transparently and convexedly toward the tire building drum 3. The plates 8 and 9 are made of a suitable metal while the curved members 15 and 16 are preferably made of an acrylic resin. An indicator film 17 which has a curvature corresponding to those of the curved members 15 and 16 is interposed between the curved members 15 and 16 and has a multiplicity of indicating lines 18 spaced from each other in a direction parallel to the rotational axis of the tire building drum 3 to be projected upon the peripheral surface of the tire building drum 3. The indicator film 17 is formed of a material having a characteristic of non-permeability for a light beam while the indicator lines 18 are each a slit vertically extending. According to the present invention, the indicator lines 18 may be transparently formed. A focus lens assembly, generally represented at 19, is arranged between the tire building drum 3 and the indicator assembly 7 and includes a tubular member 20 and two convex lenses 21 and 22 in alignment with the light beam projected through the indicator film 17 by the projector 2 so as to focalize and enlarge indicated lines 23 (see FIG. 3) on the peripheral surface of the tire building drum 3.

According to the afore-mentioned light beam projecting apparatus of the present invention, a light beam 24 is projected from the projector 2 and then passes through the curved member 16, the indicator film 17 and the curved member 15. The light beam 24 thereafter passes through the convex lenses 21 and 22 of the focus lens assembly 19 to enlarge and focalize the indicated lines 23 on the peripheral surface of the tire building drum 3 or on rubberized cord fabric applied thereon.

Under these circumstances, an attendant operator applies a first ply of unvulcanized band-formed rubberized cord fabric on the tire building drum 3 in registry with predetermined two indicated lines 23 on the peripheral surfaces of the tire building drum 3. A second ply of band-formed rubberized cord fabric is then overlappedly applied on the first ply just applied coincidently with next predetermined two indicated lines 23 on the first ply by applying an adhesive such as gasoline and the like. In the similar manner, the respectively succeeding ply or plies can reliably be applied on the just formerly applied ply of the rubberized cord fabric on the tire building drum 3.

For exchanging into a different tire size to be wrapped and produced on the tire building drum 3, another indicator film having indicating lines corresponding to the tire size should be exchanged in place of the so far used indicated film 17 so as to project the light beam on the peripheral surface of the tire building drum 3 or the applied rubberized cord fabric.

Figure 6:
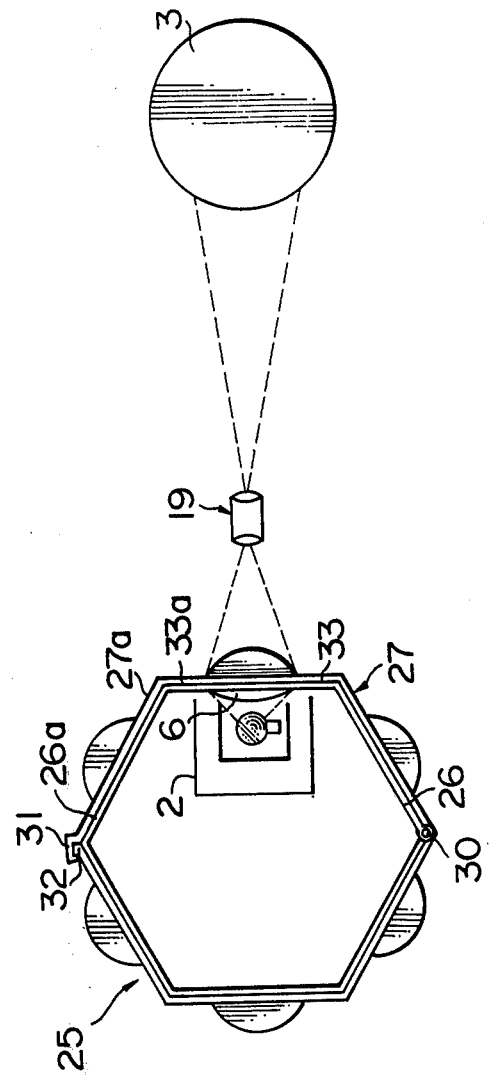
FIG. 6 is a side view similar to FIG. 2 but showing another embodiment of the light beam projecting apparatus in accordance with the present invention.
Figure 7:
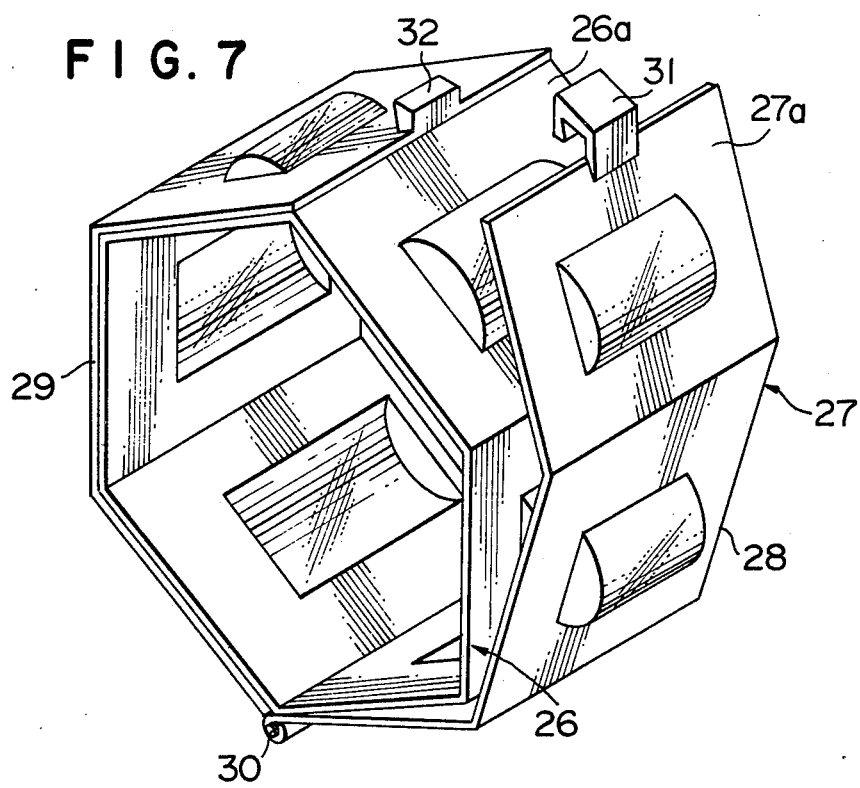
FIG. 7 is a fragmentary perspective view of another embodiment of the indicator assembly.
Figure 8:
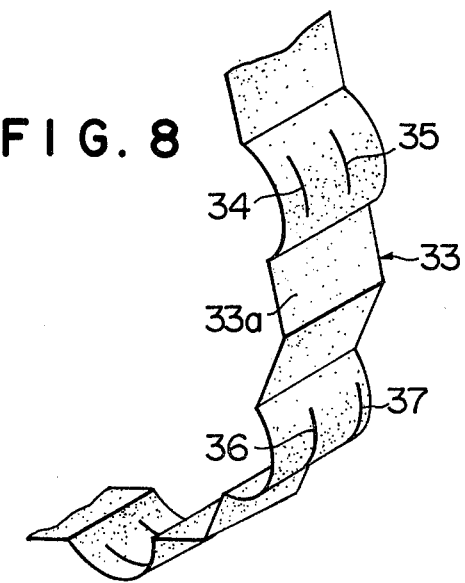
FIG. 8 is a perspective view of another embodiment of the indicator film.

Another indicator assembly 25 is shown in FIGS. 6 and 7 as being disposed surrounding the light beam projector 2 and including a pair of indicator film retainers 26 and 27 each of which is formed into a regular polygon in cross-section to have more than two planes 26a and 27a corresponding to the ply number of the rubberized cord fabrics to be wrapped on the tire building drum 3. The outer indicator film retainer 27 is composed of segments 28 and 29 having one ends hinged together by means of a pin 30 and the other ends engageable by a hook 31 and a protrusion 32 in a similar manner as seen in FIGS. 4 and 5. The indicator film retainers 26 and 27 have central portions formed transparently and convexedly also in a similar manner as seen in FIGS. 4 and 5. An indicator film 33 is shown in FIG. 8 as formed correspondingly to the configuration of the indicator film retainers 26 and 27 to have more than two planes 33a any one of which has two indicating lines 34 and 35 off-set from those of other indicating lines 36 and 37 formed on the other planes 33a. It will be understood that the indicator film retainers 26 and 27 are rotated at every time to wrap every ply of rubberized cord fabric on the tire building drum 3 to position a predetermined plane 33a of the indicating film 33 in front of the apperture of the projector 2. The indicator film retainers 26 and 27 may be rotated in synchronism with the rotation of the tire building drum 3 through a suitable electric circuit.

It will be understood from the foregoing description relative to the above embodiments of the present invention that the light beam projectors can be remarkably decreased in number and manufactured in low cost. In addition, a multitude of light beams spaced corresponding to different tire sizes can be projected only by exchanging different indicator films without transferring a number of light beam projectors as done in the conventional apparatus, with the result that the exchanging operation for different tire sizes can be easily and promptly carried out, thereby causing operational efficiency to be enhanced markedly.

Although particular embodiments of the present invention have been shown and described, it will be obvious to those skilled in the art that various changes and modifications may be made without departing from the spirit and scope of the present invention.

What is claimed is:

1. A light beam projecting apparatus for use in production of an endless rubberized cord fabric on a tire building drum, comprising:
    a light beam projector disposed in spaced and opposed relation with said tire building drum to wrap a band-formed rubberized cord fabric;
    an indicator assembly located in the vicinity of said light beam projector and interposed between said light beam projector and said tire building drum, said indicator assembly including an indicator film having a multiplicity of indicating lines spaced from each other in a direction parallel to the rotational axis of said tire building drum to be projected upon the peripheral surface of said tire building drum;
    a pair of plates having one ends hinged together by hinge means to be operable for facilitating entry of said indicator film therebetween and each having a central portion formed transparently and convexedly toward said tire building drum; and
    a focus lens assembly arranged between said tire building drum and said indicator assembly and including at least a focus lens in alignment with the light beam projected through said indicator film by said light beam projector so as to focalize and enlarge indicated lines projected on the peripheral surface of said tire building drum.

2. A light beam projecting apparatus as set forth in claim 1, in which said indicator film is formed of a material having a characteristic of non-permeability for a light beam and in which each of said indicating lines is a slit formed in said indicator film.

3. A light beam projecting apparatus as set forth in claim 1, in which said indicator film is formed of a material having a characteristic of non-permeability for a light beam and in which each of said indicating lines is transparently formed.

4. For use in production of an endless rubberized cord fabric upon a rotatable drum in several succeeding layers, at least some of which differ in width, axially of the drum, a light beam projecting apparatus, comprising:
    an indicator assembly including a patterned light-transmitting indicator means;
    a light source illuminating the indicator assembly for transmitting light through said patterned light-transmitting indicator means; and
    a focusing lens sited with respect to the indicator assembly so as to focalize and enlarge such pattern of light as is transmitted by said light-transmitting indicator means for projection onto said rotatable drum;
    the indicator assembly including an inner retainer member in the form of a multifaceted drum with respective transversally extending apices between angularly adjacent facets thereof, and an outer retainer member in the form of a correspondingly multifaceted element openably facially wrapped about said inner retainer member, means defining an aperture through each of a plurality of the facets of said inner retainer member, and a corresponding plurality of apertures through the outer retainer member, the respectively corresponding apertures of the inner and outer retainer members being in registry;
    the patterned light transmitting indicator means comprising a strip having means defining a plurality of pattern panels thereon which are longitudinally spaced on the strip from one another with means defining a transverse bend across the strip between each two adjacent panels; each panel including a ground portion which is a light barrier, and a figure portion which includes at least two parallel lines extending longitudinally of the strip; the said figure portions among the plurality of pattern panels, including at least two wherein the two parallel lines of one have a different interline spacing than that of the two parallel lines of the other; each panel being outwardly generally cylindrically convex; and the strip being removably trapped between the inner and outer retainer members, with each transverse bend overlying a respective apex of said inner retainer member and each panel being framed between a respective corresponding aperture of the inner retainer member and of the outer retainer member, with the panel bulging convexly outwards;

the light source being effectively stationed radially within the inner retainer member for shining through such one of said panels as alternatively may be aligned between the light source and the focusing lens by rotation of the indicator assembly, so that there may be alternatively projected onto the rotatable drum on which said layers are to be wrapped at least two different patterns of parallel lines that have different interline spacing, for providing visually apparent standards for the widths of at least two different ones of said layers that are intended to be of correspondingly different widths.

5. A light beam projecting apparatus, comprising in combination:

a tire building drum on which an endless rubberized cord fabric is produced;

a light beam projector disposed in spaced and opposed relation with said building drum to wrap a band-formed rubberized cord fabric;

an indicator assembly disposed surrounding said light beam projector and including a pair of indicator film retainers, each having
- more than two planes corresponding to the number of said rubberized cord fabrics to be wrapped on said tire building drum, and
- a central portion formed transparently and convexedly toward said tire building drum and an indicator film formed correspondingly to the configuration of the indicator film retainers to have more than two planes, any one of which has two indicating lines spaced from each other in a direction parallel to the rotational axis of said tire building drum and off-set from those of other indicating lines formed on the other planes; and a focus lens assembly arranged between said tire building drum and said indicator assembly and including at least
- a focus lens in alignment with the light beam projected through said indicator film by said light beam projector so as to focalize and enlarge indicated lines projected on the peripheral surface of said tire building drum, whereby said indicator film retainers are rotated for off-setting said indicating lines of said indicator films at every time when every ply of rubberized cord fabric is wrapped on said tire building drum to project two lines on said tire building drum.

* * * * *